(12) United States Patent
Merrill et al.

(10) Patent No.: US 8,469,400 B2
(45) Date of Patent: Jun. 25, 2013

(54) SEAT HARNESS PRETENSIONER

(75) Inventors: David T. Merrill, Scottsdale, AZ (US); Todd Humbert, Chandler, AZ (US)

(73) Assignee: AmSafe, Inc. (Phoenix Group), Phoenix, AZ (US)

( * ) Notice: Subject to any disclaimer, the term of this patent is extended or adjusted under 35 U.S.C. 154(b) by 134 days.

(21) Appl. No.: 12/711,235

(22) Filed: Feb. 23, 2010

(65) Prior Publication Data

US 2010/0219667 A1   Sep. 2, 2010

Related U.S. Application Data

(60) Provisional application No. 61/154,731, filed on Feb. 23, 2009.

(51) Int. Cl.
*B60R 22/00* (2006.01)

(52) U.S. Cl.
USPC ........ 280/801.1; 280/806; 280/807; 297/480; 297/484

(58) Field of Classification Search
USPC ............ 280/801.1, 801.2, 806, 807; 297/480, 297/484
See application file for complete search history.

(56) References Cited

U.S. PATENT DOCUMENTS

| | | |
|---|---|---|
| 4,527,830 A | 7/1985 | Meyers |
| 4,660,889 A | 4/1987 | Anthony et al. |
| 4,679,852 A | 7/1987 | Anthony et al. |
| 4,738,485 A | 4/1988 | Rumpf |
| 4,787,677 A | 11/1988 | Reighter |
| 4,826,246 A | 5/1989 | Meeker |
| 4,884,652 A | 12/1989 | Vollmer |
| 5,031,962 A | 7/1991 | Lee |
| 5,039,169 A | 8/1991 | Bougher et al. |
| 5,061,012 A | 10/1991 | Parker et al. |
| 5,143,420 A | 9/1992 | Switlik |
| 5,219,203 A | 6/1993 | Switlik |
| 5,265,828 A | 11/1993 | Bennington |
| 5,283,933 A | 2/1994 | Wiseman et al. |
| 5,286,090 A | 2/1994 | Templin et al. |
| 5,377,386 A | 1/1995 | Griffith |
| 5,383,708 A | 1/1995 | Nagasaka et al. |
| 5,466,044 A | 11/1995 | Barley et al. |
| 5,487,588 A | 1/1996 | Burleigh et al. |

(Continued)

FOREIGN PATENT DOCUMENTS

| | | |
|---|---|---|
| CA | 2038505 A1 | 9/1991 |
| CA | 2038122 A1 | 12/1991 |

(Continued)

OTHER PUBLICATIONS

U.S. Appl. No. 12/569,522, filed Sep. 29, 2009, Humbert.

(Continued)

*Primary Examiner* — Toan To
(74) *Attorney, Agent, or Firm* — Perkins Coie LLP

(57) ABSTRACT

Various embodiments of seat harness pretensioning devices for use in land, air, and sea vehicles are described herein. In one embodiment, a seat unit for use in a military land vehicle or helicopter includes a stroking device that enables the seat to move downwardly in response to an explosion or hard landing, respectively. The seat unit also includes a seat belt or harness that extends around the occupant in the seat. Downward movement of the seat in response to an explosion or hard landing causes a tensioning system to automatically pretension the seat harness.

15 Claims, 10 Drawing Sheets

U.S. PATENT DOCUMENTS

| | | | |
|---|---|---|---|
| 5,511,856 A | 4/1996 | Merrick et al. | |
| 5,524,928 A | 6/1996 | Monagas | |
| 5,524,965 A | 6/1996 | Barley | |
| 5,536,066 A | 7/1996 | Sedlack | |
| 5,560,565 A | 10/1996 | Merrick et al. | |
| 5,588,189 A | 12/1996 | Gorman et al. | |
| 5,605,375 A | 2/1997 | Friedrich et al. | |
| 5,606,783 A | 3/1997 | Gillis et al. | |
| 5,611,597 A | 3/1997 | Lanz | |
| 5,628,548 A | 5/1997 | Lacoste | |
| 5,669,663 A | 9/1997 | Feuerherdt | |
| 5,695,243 A | 12/1997 | Anthony et al. | |
| 5,779,319 A | 7/1998 | Merrick | |
| 5,816,651 A | 10/1998 | Feuerherdt | |
| 5,839,793 A | 11/1998 | Merrick et al. | |
| 5,873,599 A | 2/1999 | Bauer et al. | |
| 5,873,635 A | 2/1999 | Merrick | |
| 5,890,762 A | 4/1999 | Yoshida | |
| 5,908,223 A | 6/1999 | Miller | |
| 5,915,787 A | 6/1999 | Brookman | |
| 5,918,834 A | 7/1999 | Sommer et al. | |
| 5,941,601 A | 8/1999 | Scott et al. | |
| 5,979,982 A | 11/1999 | Nakagawa | |
| 5,996,192 A | 12/1999 | Haines et al. | |
| 6,017,087 A | 1/2000 | Anthony et al. | |
| 6,030,046 A | 2/2000 | Dorow | |
| 6,082,819 A | 7/2000 | Jackson | |
| 6,139,111 A * | 10/2000 | Pywell et al. | 297/484 |
| 6,182,783 B1 | 2/2001 | Bayley | |
| 6,183,044 B1 | 2/2001 | Koyanagi et al. | |
| 6,209,957 B1 | 4/2001 | Baloga et al. | |
| 6,220,662 B1 | 4/2001 | Franco-Vila et al. | |
| 6,260,925 B1 | 7/2001 | Miller | |
| 6,343,837 B1 | 2/2002 | Gage | |
| 6,357,790 B1 | 3/2002 | Swann et al. | |
| 6,402,251 B1 | 6/2002 | Stoll | |
| 6,425,632 B1 | 7/2002 | Anthony et al. | |
| 6,447,060 B1 | 9/2002 | Vila et al. | |
| 6,450,576 B1 | 9/2002 | Rhein et al. | |
| 6,463,638 B1 | 10/2002 | Pontaoe | |
| 6,517,154 B2 | 2/2003 | Sawamoto | |
| 6,543,722 B1 | 4/2003 | Parrow et al. | |
| 6,561,588 B1 | 5/2003 | Brady | |
| 6,582,015 B2 * | 6/2003 | Jessup et al. | 297/216.17 |
| 6,616,242 B1 | 9/2003 | Stoll | |
| 6,669,288 B2 | 12/2003 | Nakagawa et al. | |
| 6,694,577 B2 | 2/2004 | Di Perrero et al. | |
| 6,764,135 B2 | 7/2004 | Sasaki et al. | |
| 6,767,057 B2 | 7/2004 | Neelis | |
| 6,767,058 B2 | 7/2004 | McClellan-Derrickson | |
| 6,772,973 B2 | 8/2004 | Fujii et al. | |
| 6,773,075 B2 * | 8/2004 | Rouhana et al. | 297/484 |
| 6,817,629 B2 * | 11/2004 | Herberg et al. | 280/801.1 |
| 6,820,310 B2 | 11/2004 | Woodard et al. | |
| 6,837,547 B2 * | 1/2005 | Delventhal et al. | 297/484 |
| 6,962,394 B2 | 11/2005 | Anthony et al. | |
| 6,979,057 B2 | 12/2005 | Sedlack | |
| 7,011,341 B2 * | 3/2006 | Herberg et al. | 280/807 |
| 7,029,067 B2 | 4/2006 | Vits et al. | |
| 7,044,548 B2 | 5/2006 | Mullen et al. | |
| 7,077,475 B2 | 7/2006 | Boyle | |
| 7,144,085 B2 | 12/2006 | Vits et al. | |
| 7,159,285 B2 | 1/2007 | Karlsson et al. | |
| 7,201,399 B2 * | 4/2007 | Frank et al. | 280/801.1 |
| 7,246,854 B2 | 7/2007 | Dingman et al. | |
| 7,278,684 B2 | 10/2007 | Boyle | |
| 7,347,494 B2 | 3/2008 | Boyle et al. | |
| 7,464,989 B2 | 12/2008 | Merrill | |
| 7,488,038 B2 | 2/2009 | Boyle et al. | |
| 7,625,048 B2 * | 12/2009 | Rouhana et al. | 297/484 |
| 7,673,906 B2 * | 3/2010 | Bell | 280/806 |
| 7,775,557 B2 * | 8/2010 | Bostrom et al. | 280/801.1 |
| 7,976,092 B2 * | 7/2011 | Meredith et al. | 296/63 |
| 8,016,318 B2 * | 9/2011 | Nezaki | 280/733 |
| 8,066,303 B2 * | 11/2011 | Nezaki | 280/806 |
| 2002/0000744 A1 | 1/2002 | Maciejczyk | |
| 2003/0057750 A1 | 3/2003 | Blackler | |
| 2004/0036345 A1 | 2/2004 | Herberg et al. | |
| 2005/0269846 A1 | 12/2005 | Vits et al. | |
| 2006/0082129 A1 | 4/2006 | Dingman et al. | |
| 2006/0082200 A1 | 4/2006 | Woellert et al. | |
| 2006/0103200 A1 | 5/2006 | Dingman et al. | |
| 2007/0120001 A1 | 5/2007 | Esler et al. | |
| 2008/0012285 A1 | 1/2008 | Holbein et al. | |
| 2008/0100051 A1 | 5/2008 | Bell et al. | |
| 2008/0100122 A1 | 5/2008 | Bell et al. | |
| 2008/0203793 A1 | 8/2008 | Boyle et al. | |

FOREIGN PATENT DOCUMENTS

| | | |
|---|---|---|
| CA | 2086479 A1 | 7/1993 |
| CA | 2450995 A1 | 2/2003 |
| CA | 2551335 A1 | 12/2006 |
| DE | 19738430 A1 | 3/1999 |
| EP | 0462930 A1 | 12/1991 |
| EP | 0552570 A2 | 7/1993 |
| EP | 0560184 A1 | 9/1993 |
| EP | 0619201 A1 | 10/1994 |
| EP | 0619202 A1 | 10/1994 |
| EP | 0646491 A1 | 4/1995 |
| EP | 0703113 A2 | 3/1996 |
| EP | 0714806 A2 | 6/1996 |
| EP | 0841209 A1 | 5/1998 |
| EP | 0970842 A1 | 1/2000 |
| EP | 0982182 A1 | 3/2000 |
| EP | 1059194 A1 | 12/2000 |
| EP | 1193111 A2 | 4/2002 |
| EP | 1231100 A1 | 8/2002 |
| EP | 1472949 A1 | 11/2004 |
| EP | 1631166 A2 | 3/2006 |
| JP | 5254367 A | 10/1993 |
| JP | 10119611 A | 5/1998 |
| JP | 10119612 A | 5/1998 |
| JP | 2001030811 A | 2/2001 |
| WO | WO-03009717 A2 | 2/2003 |
| WO | WO-03010024 A2 | 2/2003 |
| WO | WO-03010035 A1 | 2/2003 |
| WO | WO-2005000625 A2 | 1/2005 |
| WO | WO-2005037605 A2 | 4/2005 |
| WO | WO-2005102112 A1 | 11/2005 |
| WO | WO-2006044559 A2 | 4/2006 |
| WO | WO-2006044627 A2 | 4/2006 |
| WO | WO-2006044809 A1 | 4/2006 |
| WO | WO-2006044830 A2 | 4/2006 |

OTHER PUBLICATIONS

Child Restraint Systems, Department of Aviation Administration, Federal Aviation Adm. 14 CFR.
Improving the Safety of Older Child Passengers, Nov. 2005.
International Search Report and Written Opinion for PCT Application No. PCT/US2007/66476; Applicant: AmSafe Commercial Products; Date of Mailing: Jan. 25, 2008, 10 pages.
International Search Report and Written Opinion for PCT Application No. PCT/US2009/31613; Applicant: AmSafe Commercial Products, Inc.; Date of Mailing: Mar. 3, 2009, 9 pages.
International Search Report and Written Opinion for PCT Application No. PCT/US2009/58806; Applicant: AmSafe, Inc.; Date of Mailing: Jan. 20, 2010, 10 pages.
Restraint Use on Aircraft, American Academy of Pediatrics vol. 108, No. 5, Nov. 2001.
Safefit, Cover N' Carry Car Seat Protector, www.Amazon.com.
Safer Airplane Travel with Babies & Toddlers, www.saferidenews.com.
Tiny Air Travelers at Risk, Brad Watson Reports, Jan. 26, 2006.
Ultimate Black Car Seat Travel Bag, www.target.com.
Wheelie Car Seat Travel Bag by JL Childress, www.Go-Baby.com.

* cited by examiner

SEAT HARNESS PRETENSIONER

CROSS-REFERENCE TO RELATED APPLICATION(S) INCORPORATED BY REFERENCE

The present application claims priority to U.S. Provisional Patent Application No. 61/154,731, entitled "SEAT HARNESS PRETENSIONER," and filed Feb. 23, 2009, which is incorporated herein in its entirety by reference.

TECHNICAL FIELD

The following disclosure is directed generally to the field of personal restraints for use in vehicles and, more particularly, to the field of seat harness pretensioners for use in military land vehicles, air vehicles, and other vehicles.

BACKGROUND

Military land vehicles generally have a three, four or five point seat/shoulder belt or harness in one or more of the vehicle seats. Civilian vehicles generally have a three point shoulder belt/lap belt harness. To minimize or reduce injury during a collision or rollover, both military and civilian vehicles have used seat harness pretensioners. In a typical pretensioner, sensors on the vehicle detect the acceleration and/or deceleration forces of a collision or rollover, causing the pretensioners to actuate. The pretensioners then tighten up the seat harness around the seated passenger or driver, milliseconds before the actual full impact or rollover. The tightened harness holds the passenger securely into the seat, reducing impact and rebound injuries. These existing pretensioners are relatively complicated designs because they rely on pyrotechnic devices or electric motors operating a belt retractor, each controlled by an electronic trigger.

Many military land vehicles are designed to resist the destructive forces of mines and improvised explosive devices (IED's). These explosive devices create unique risks to military land vehicles. Detonation of a large explosive device can generate forces on the vehicle exceeding 100 g's, causing the vehicle to accelerate violently upwardly. To reduce the forces on the vehicle crew during a detonation, some military vehicles, such as the Joint Light Tactical Vehicle (JLTV), Bradley Fighting Vehicle, Mine Resistant Ambush Protected Vehicle (MRAP), have blast attenuating seats. Blast attenuating seats are often supported on shock absorbing materials or mounted on a structure, such as a stroking device, that allows the seat to move downward during a blast.

Conventional harness pretensioning techniques are generally not useful with these types of blast attenuating seats, because these seats move relative to the vehicle body during the blast, and because the acceleration is largely vertical, rather than horizontal. In addition, conventional harness pretension techniques require use of pyrotechnic devices or electric retractor motors, and electronic sensors, which can be complicated, costly, and subject to failure due to the harsh operating environment of military vehicles.

Passengers in helicopters are subjected to similar types of extreme forces during crashes or hard landings. Some helicopters also have seats mounted on a stroking device. The engineering challenges presented in harness pretensioning with blast attenuation seats are also present in helicopter seats mounted on stroking devices. Accordingly, it would be advantageous to provide a seat harness pretensioning system for use with vehicle seats that move downwardly to reduce impact on a passenger.

SUMMARY

In one aspect, a seat unit for a land vehicle or helicopter has a stroking device for moving a seat downwardly in response to an explosion or a hard landing, respectively. A tensioning belt is attached to a seat harness and at least indirectly to the vehicle body. Downward movement of the seat in response to an explosion or hard landing automatically pretensions the seat harness.

In another aspect, a tensioning element, such as a locking bar, is attached to the tensioning belt at the back of the seat. A trigger holds the tensioning element in place against the force of a spring. A trigger actuator actuates the trigger in response to downward movement of the seat, allowing the spring force to move the tensioning element to pretension the harness. A limiter limits or prevents upward movement of the tensioning element, to keep the harness tensioned permanently, or for a selected time interval.

In a further aspect, in a method for pretensioning a seat harness, the seat moves down in response to a blast outside of the vehicle, as the blast drives the vehicle upwardly (away from the ground). The seat harness is automatically pretensioned via the downward movement of the seat. A similar method may be used in a helicopter to pretension a seat harness during a hard landing or crash.

Other and further objects and advantages will become apparent from the following description and associated drawings. The description provides examples of how the invention may be configured, and is not intended to describe the limits or scope of the invention, which is set forth in the claims. Features and elements in one embodiment may of course also be used in the other embodiments.

DETAILED DESCRIPTION

The present disclosure describes various embodiments of pretensioning devices for use with personal restraint systems in land, air, and sea vehicles. In one embodiment, for example, a seat unit for use in a land vehicle or helicopter includes a stroking device that enables the seat to move downwardly in response to an explosion or hard landing, respectively. The seat unit also includes a tensioning web or belt attached to a harness that extends around the seat occupant. Downward movement of the seat in response to an explosion or hard landing causes the tensioning belt to automatically pretension the seat harness. In various embodiments of the disclosure described herein, seat harness pretensioning systems may be entirely mechanically operated via movement of the seat, with no electrical or pyrotechnic components needed. In other embodiments, however, seat harness pretensioning systems configured in accordance with the present disclosure can include one or more electrical or pyrotechnic components to actuate or otherwise facilitate harness pretensioning in response to movement of the seat.

Certain details are set forth in the following description and in FIGS. 1-8 to provide a thorough understanding of various embodiments of the disclosure. Other details describing well-known structures and systems often associated with vehicle seats, seat stroking devices, webs retractors, seat harnesses and other personal restraint devices, etc. have not been set forth in the following disclosure to avoid unnecessarily obscuring the description of the various embodiments of the invention.

Many of the details, dimensions, angles and other features shown in the Figures are merely illustrative of particular embodiments of the disclosure. Accordingly, other embodiments can add other details, dimensions, angles and features without departing from the spirit or scope of the present invention. In addition, those of ordinary skill in the art will appreciate that further embodiments of the invention can be practiced without several of the details described below. In the Figures, identical reference numbers identify identical, or at least generally similar, elements.

Figure 1:
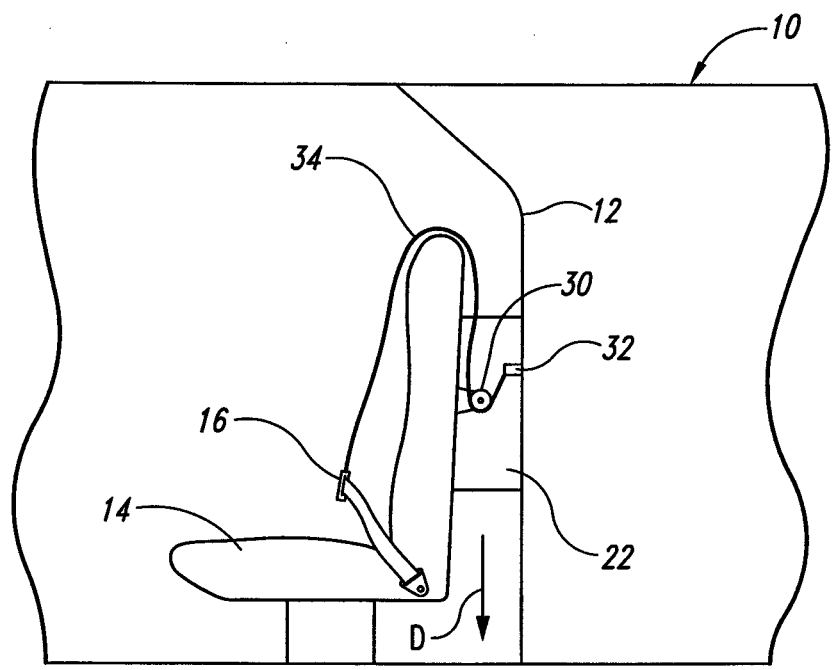
FIG. 1 is a schematic side view of a seat harness pretensioner configured in accordance with an embodiment of the disclosure.

FIG. 1 is a schematic side view of a seat harness pretensioning system configured in accordance with an embodiment of the disclosure. In this embodiment, a seat 14 is supported by a stroking mechanism 22 on the body 12 of a vehicle 10. The seat 14 and stroking mechanism 22 form a blast resistant seat. The stroking mechanism 22 may be provided in any form that moves the seat downwardly (in the direction of the arrow D in FIG. 1) during a detonation, explosion, or other event that accelerates the vehicle 10 upwardly. The stroking mechanism accordingly may be attached to the back, bottom, or even the sides of the seat. In addition, some blast resistant seats are essentially suspended within the body 12 of the vehicle. The pretensioners shown in the drawings and described herein may be used with virtually any type of blast resistant seat.

A seat harness 16 is attached to the seat 14. The seat harness 16 is typically a three, four or five point harness assembly having webs or belts extending over the seat occupant's hips and shoulders. A front end of a tensioning member or belt 34 is attached to the harness 16. The tensioning belt 34 extends around a seat roller 30 rotatably mounted on the back of the seat 14, and a back end of the tensioning belt 34 is tied off to an anchor 32 on the vehicle body 12.

Referring still to FIG. 1, in use, during a detonation, as the vehicle body 12 accelerates upwardly, the stroking mechanism 22 moves the seat downwardly, as is well known with blast resistant seats. As the seat 14 moves downwardly relative to the vehicle body 12, the seat roller 30 moves down with the seat 14, while the back end of the tensioning belt 34 remains fixed in place on the vehicle body. Consequently, the tensioning belt 34 pulls the seat harness 16 up, placing the seat harness 16 in tension. The harness 16 is accordingly pretensioned during the blast event. The harness 16 remains in tension until the stroking mechanism moves back up to its original position. In other embodiments, it is contemplated that the roller 30 can be replaced with a suitable guide that lets the tensioning belt 34 slide therethrough in response to movement of the seat 14 relative to the vehicle body 12.

Figure 2:
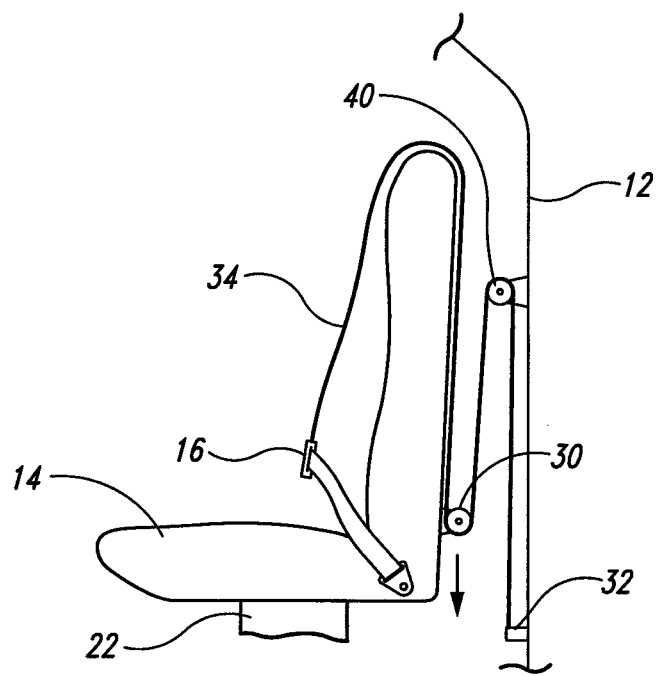
FIG. 2 is a schematic side view of a seat harness pretensioner configured in accordance with another embodiment of the disclosure.

FIG. 2 is a schematic side view of a seat harness pretensioning system configured in accordance with another embodiment of the disclosure. The embodiment illustrated in FIG. 2 is similar to the design shown in FIG. 1, but further including an anchor roller 40 on the vehicle body 12. The tensioning belt 34 passes around the seat roller 30 and the anchor roller 40, with the back end of the tensioning belt 34 attached to an anchor 32 on the vehicle body, below the anchor roller 40. In this design, the rollers 30 and 40 form a pulley arrangement that increases the tensioning pull force on the tensioning belt 34 while acting over a shorter distance. The tensioning belt 34, one or both rollers 30 and 40, and the anchor 32 form means for pretensioning the harness with downward movement of the seat.

Figure 3A:
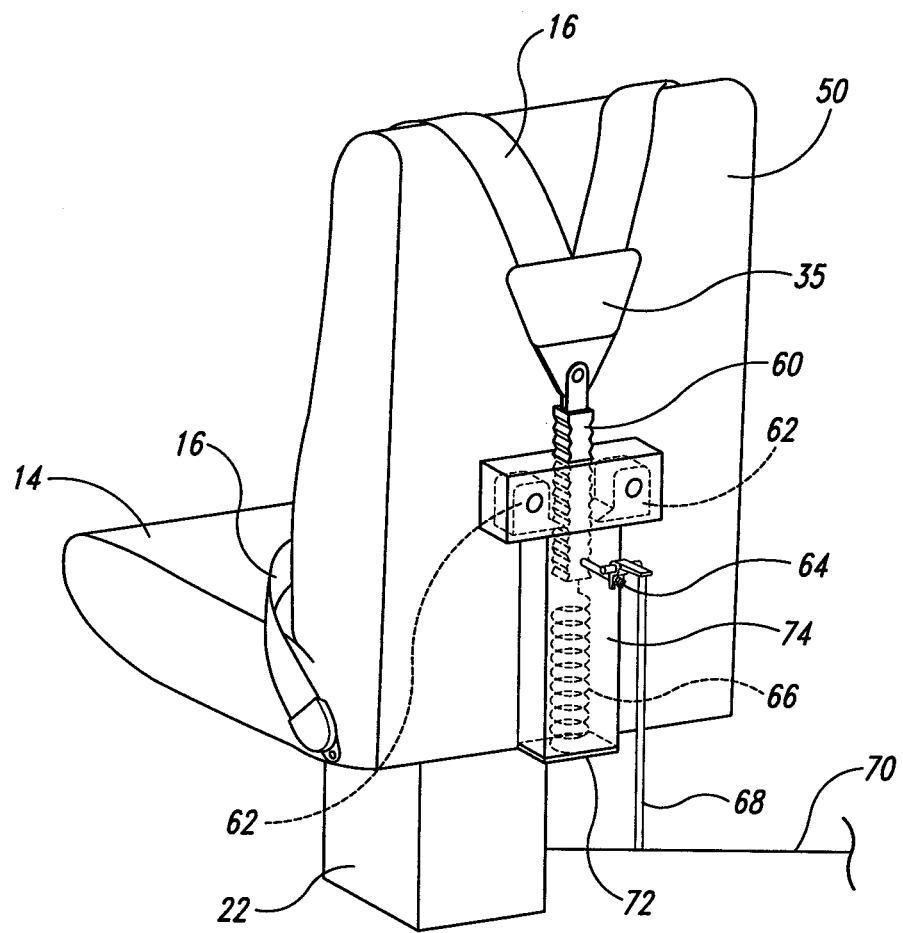
FIGS. 3A-3F are a series of perspective views of seat harness pretensioning apparatuses and systems configured in accordance with further embodiments of the disclosure.

FIG. 3A is a perspective view of a seat harness pretensioning system configured in accordance with a further embodiment of the disclosure. FIG. 3A shows a third design with the harness 16, or a tensioning belt section 35 joined to the harness 16, attached to a tensioning bar 60. The tensioning bar 60 may have teeth, slots or grooves on one or both sides. In the design shown in FIG. 3A, the teeth are on both sides of the tensioning bar 60. A ratchet 62 engages with the teeth on the tensioning bar 60. This allows the tensioning bar to move down, but not up. The two ratchets 62 shown in FIG. 3 may be spring biased against the tensioning bar 60. A biasing member or tension spring 66 (e.g., a coil spring) extends between a base plate 72 at the back of the seat 14 and the tensioning bar 60. The spring 66 exerts a downward force on the tensioning bar 60. A trigger pin 64 extending into or through a spring guide 74 holds the tensioning bar 60 in place against the downward force exerted by the spring 66. A trigger pin actuator or link 68 is operably coupled to, or in contact with, the trigger pin 64 and the floor 70 or body 12 of the vehicle.

In operation, the stroking mechanism 22 enables the seat 14 to move downwardly in response to a detonation or similar event. This causes the trigger pin actuator 68 to push upwardly on the trigger pin 64, which in turn causes the trigger pin 64 to shear off, or pull out from the spring guide 74, releasing the tensioning bar 60. The spring 66 pulls the tensioning bar 60 down rapidly. The tensioning bar 60 pulls the tensioning section 35, which tensions the seat harness 16. Since the tensioning bar 60 can move down several inches in a fraction of a second, even a large amount of slack in the seat harness, if present, can be taken up. The ratchets 62 prevent any significant reverse upward movement of the tensioning bar 60. Accordingly, the harness remains tensioned holding the passenger tightly in the seat 14, until the passenger is released using a release buckle at the front or side of the harness. If desired, the pretensioner in FIG. 3A can be reset by releasing the ratchets, returning the tensioning bar 60 to its original position, and replacing the trigger pin 64 and the trigger pin actuator 68. In other embodiments, the tensioning bar 60 can be released with other devices. For example, in certain embodiments the trigger pin 64 can be retracted by a solenoid that is activated by a sensor.

As used herein, down means generally in the direction of gravity. With the vehicle in a normal upright position, for example, down is shown by the arrow D in FIG. 1. A stroking device is any device or design that moves a seat down, or that allows a seat to move down, during an impact (e.g., an explosion near a ground vehicle or a crash or hard landing in a helicopter), or other acceleration or deceleration event of a sufficient or preset magnitude.

The ratchets 62 may be replaced by various equivalent elements that also allow only one way movement of the tensioning bar 60. Alternatively, the tensioning bar 60 may be designed so that it moves down rapidly, but can move up only very slowly (e.g., after 2-10 seconds), so that the harness is untensioned after the detonation and any subsequent rebound or landing impact. Rollers or pinion gears engaging the tensioning bar and freewheeling in the forward direction and with viscous or drag rotation in the reverse direction may be used for this purpose. In other embodiments, such a tensioning bar can incorporate, for example, a suitable fluid damping system with an appropriate flow valve to allow rapid movement in one direction but much slower movement in the opposite direction.

The tensioning bar 60 may equivalently be replaced by other elements that can cooperate with one way movement devices. For example, the tensioning bar 60 may be replaced with a section of belt webbing, chain, or other one-way mechanical linkage. Similarly, the trigger pin 64 and the trigger pin actuator 68 may be replaced with other elements that hold the harness 16, or the tensioning bar 60 (if used), in place against the force of the spring 66, until the seat 14 moves down in response to a detonation. For example, the trigger pin 64 may be a shear pin that shears off as the seat 14 moves down, allowing the spring force to act to pretension the harness. Alternatively, the trigger pin 64 may be connected to a cable, strap, or other link attached to a sidewall of the vehicle body 12, or other surface that remains fixed in place relative to the vehicle body 12 as the seat 14 moves down. The vehicle body 12 can include portions of the seat that are fixed to the vehicle body (and do not move on the stroking device). The spring 66 may be replaced by another element that exerts tensioning force on the harness, for example an actuator or gas cylinder.

The tensioning bar 60, the spring 66, the trigger 64, and the ratchet 62 or other tensioning bar movement limiter, form means for tensioning the harness with downward movement of the seat 14. In each of the designs described herein, the tensioning belt 34 may of course be made as part of the harness itself, or as apart of the tensioning or pull-down element 60.

Figure 3B:
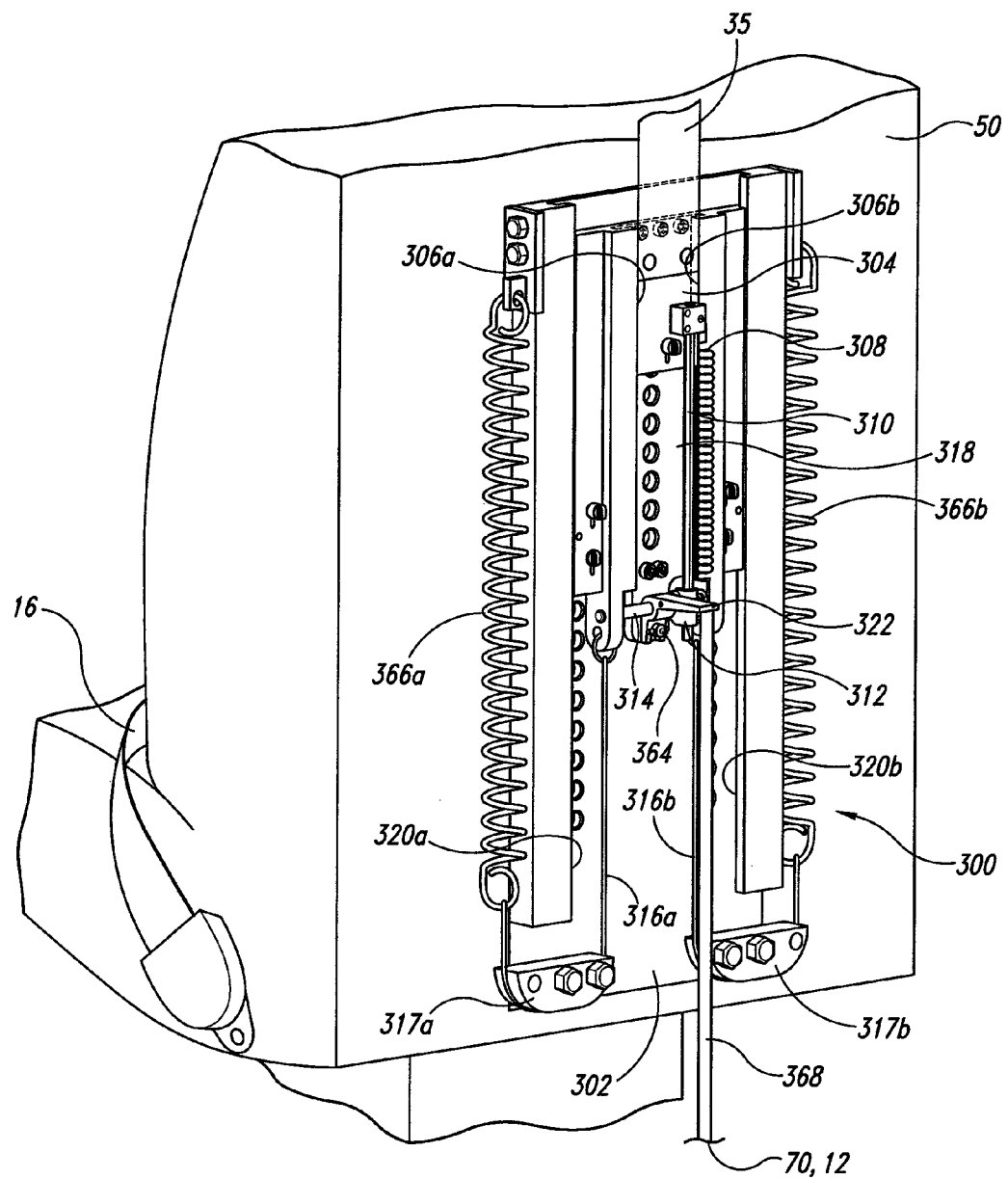

FIGS. 3B-3F are a series of perspective views illustrating various aspects of a seat harness pretensioning system 300 configured in accordance with another embodiment of the disclosure. Referring first to FIG. 3B, in one aspect of this embodiment the tensioning section 35 has a first end portion attached to an upper part of the seat harness 16 (e.g. the shoulder belts) and a second end portion fixedly attached to a first carrier plate 304. The first carrier plate 304 is movably carried in first tracks 306a, b formed in a second carrier plate 318. The second carrier plate 318 is carried in second tracks 320a, b on a base plate 302. The base plate 302 is mounted on a back portion of the seat 50.

During normal operation, the first carrier plate 304 is configured to slide up and down in the first tracks 306a, b under force of a tension spring 308 to maintain some tension or preload in the harness 16. As the first carrier plate 304 moves up and down, an elongate guide member 310 (e.g., a guide rod) extending therefrom slides up and down through a guide fitting 312 supported by the second carrier plate 318, as shown in FIG. 3D.

In the illustrated embodiment, each of two biasing members or tension springs (e.g., coil springs) 366a, b has one end portion fixedly attached to an upper side portion of the base plate 302, and a second end portion attached to a corresponding cable 316a, b. Each of the cables 316 slidably passes around a corresponding cable guide 317 and is attached to a corresponding lug on a lower side region of the second carrier plate 318. The second carrier plate 318 is normally held stationary in the second tracks 320a, b against the force of the tension springs 366 by means of a trigger pin 364. As described in greater detail below, however, when the seat 50 strokes downward (under, e.g., an explosion, detonation, etc.), the first carrier plate 304 is locked into position relative to the second carrier plate 318, and the second carrier plate 318 is released and allowed to move downward in the second tracks 320a, b under force of the tension springs 366a, b, thereby pulling downward on the tensioning section 35 and pretensioning the harness 16.

Figure 3C:
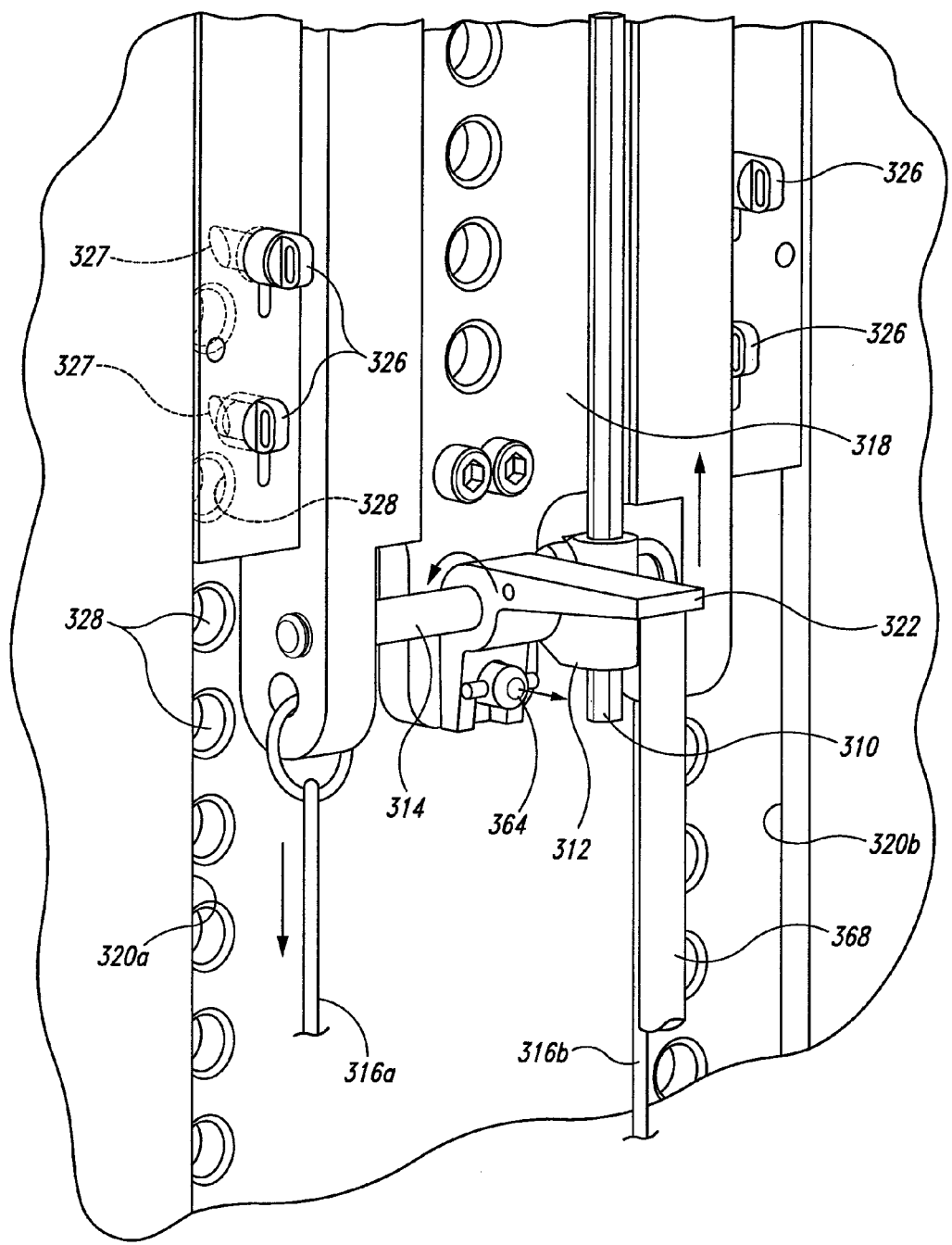
Figure 3D:
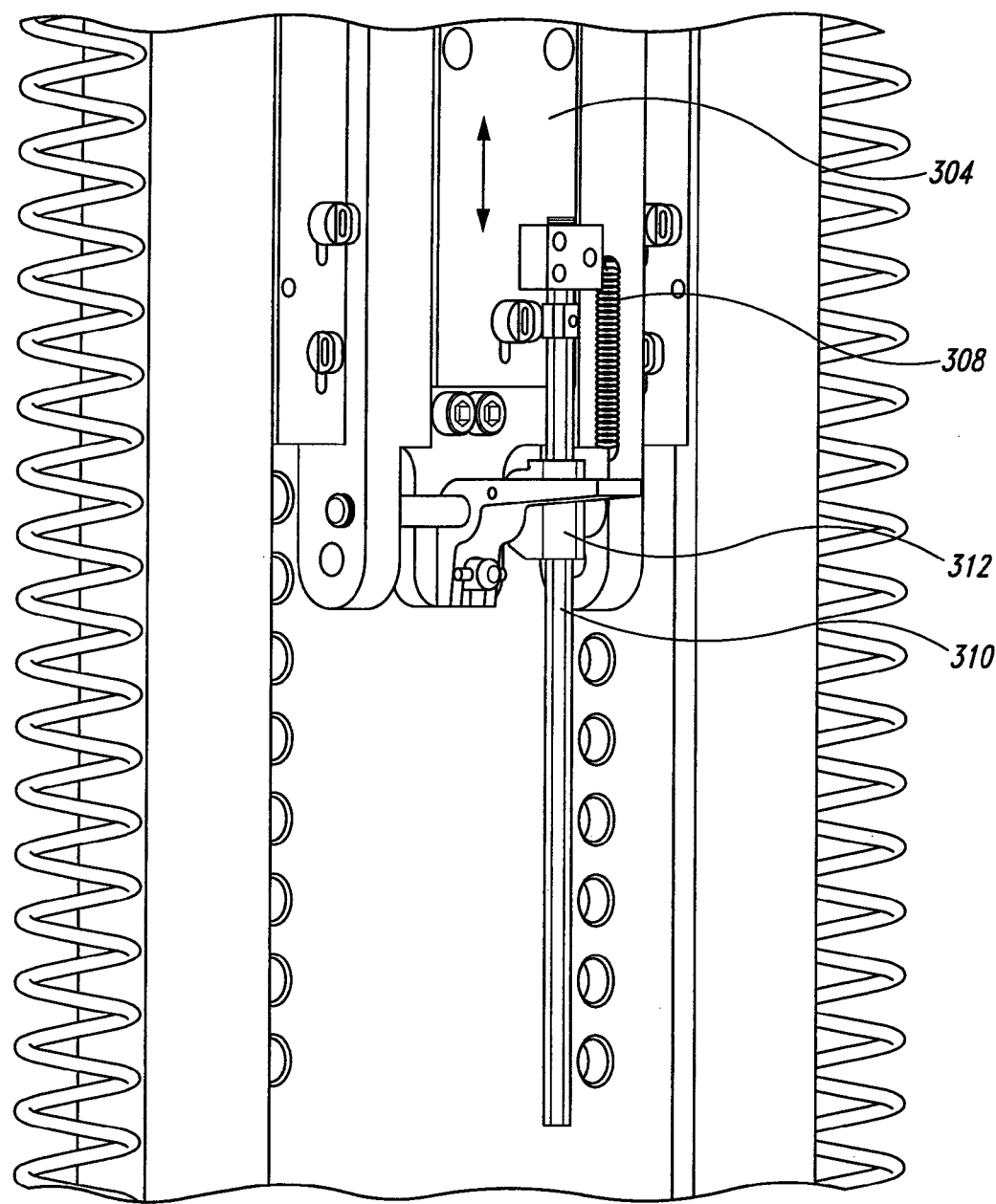

FIG. 3C is an enlarged perspective view illustrating a method of retracting the trigger pin 364 and releasing the second carrier plate 318 from the base plate 302 in accordance with an embodiment of the disclosure. In this embodiment, a pin puller or release arm 322 (e.g. a rocker arm) is pivotally attached to the second carrier plate 318 via a shaft 314. A first forked end portion of the release arm 322 is coupled to an end portion of the trigger pin 364, and a distal second end portion of the release arm 322 is positioned against, or otherwise operably coupled to, a trigger pin actuator (e.g., a push rod) 368 that is supported by the vehicle floor 70 or body 12.

Similar to the embodiment described above with reference to FIG. 3A, in the embodiment of FIG. 3C the stroking mechanism 22 enables the seat 14 to move downwardly in response to a detonation or similar event. This causes the actuator 368 to push upwardly on the distal end portion of the release arm 322, which in turn causes the release arm 322 to rotate about the pivot shaft 314 and pry, lever, or otherwise extract the trigger pin 364 outwardly from a hole or recess (not shown) formed in the base plate 302. This action releases the second carrier plate 318 from the base plate 302 and, as explained below with reference to FIGS. 3E and 3F, this action simultaneously causes the second carrier plate 318 to engage the first carrier plate 304 so that they move downwardly together under force of the tension springs 366.

Figure 3E:
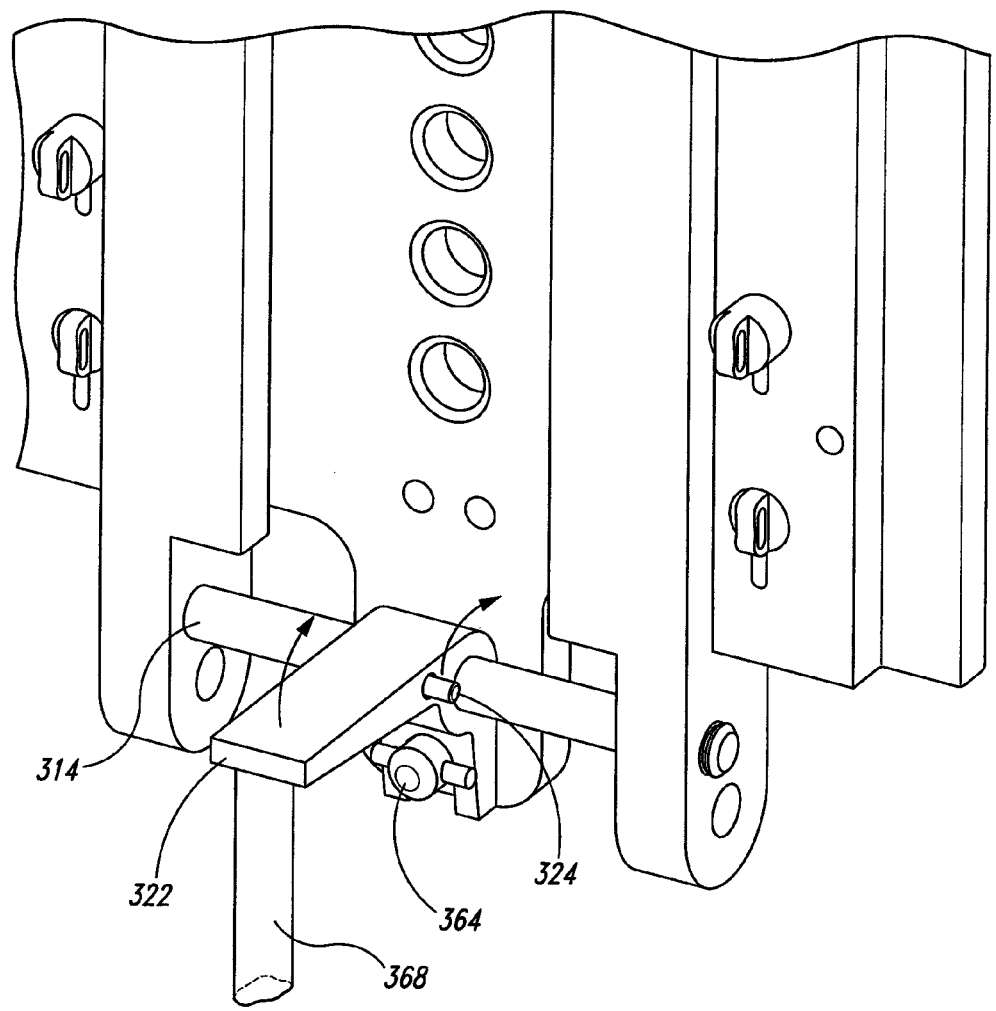
Figure 3F:
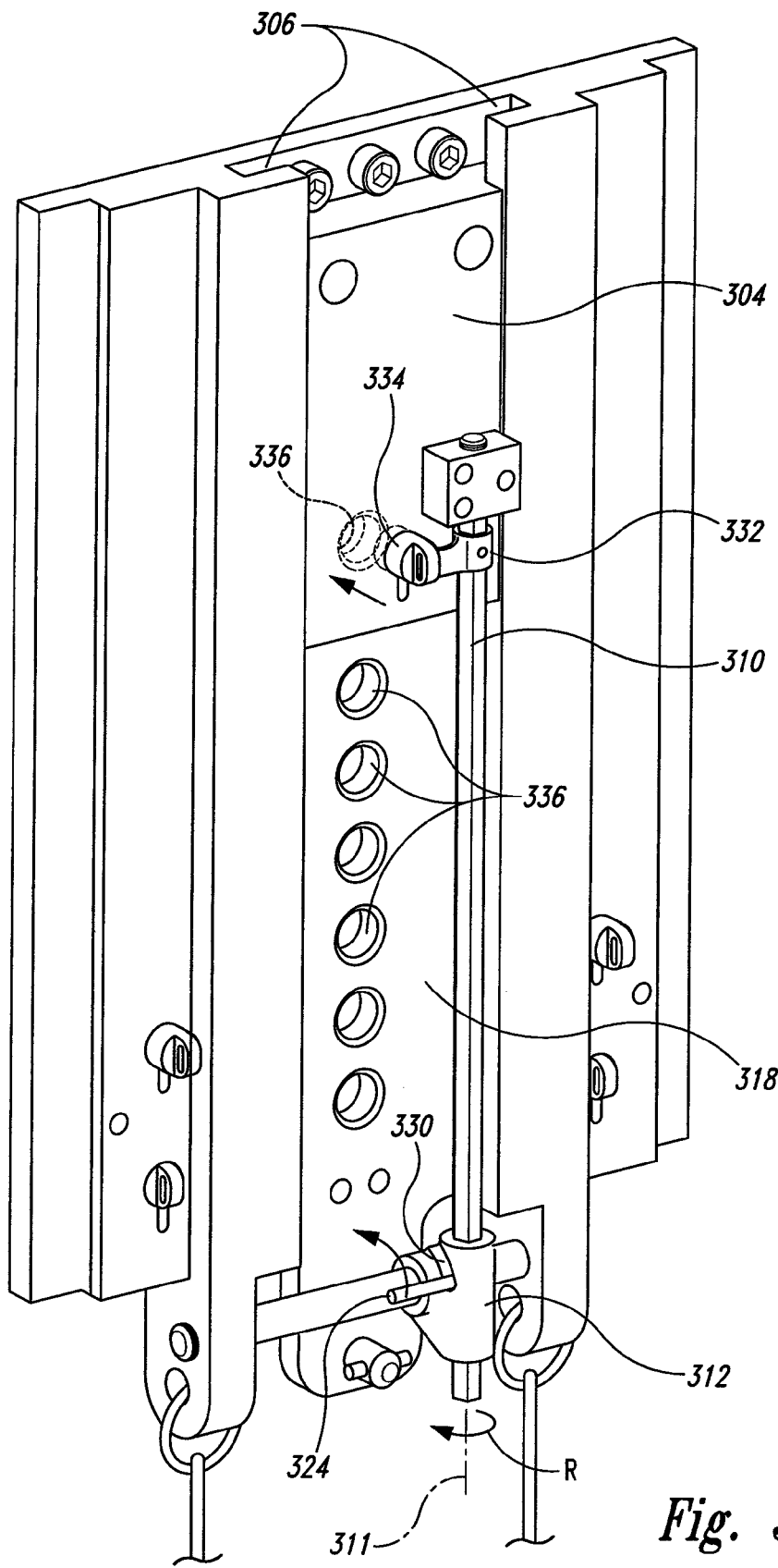

FIGS. 3E and 3F are perspective views illustrating operation of the guide fitting 312 in accordance with an embodiment of the disclosure. More specifically, FIG. 3E is an enlarged perspective view of a portion of the pretensioning system 300 with the guide fitting 312 removed for clarity, and FIG. 3F is another perspective view of this area with the release arm 322 removed for clarity. A pin 324 (FIG. 3E) extends outwardly from the release arm 322, and is movably received in an adjacent track 330 in the guide fitting 312 (FIG. 3F). As the actuator 368 drives the release arm 322 upwardly in response to downward movement of the seat 50, the pin 324 moves in an arc and causes the guide fitting 312 to rotate about the longitudinal axis 311 of the guide member 310. In this embodiment, the guide member 310 can have a hexagonal or other polygonal cross-sectional shape that enables the guide fitting 312 to rotate the guide member 310 as the guide fitting 312 rotates.

As shown in FIG. 3F, a link or arm 332 extends outwardly from an upper portion of the guide member 310, and has a distal end coupled to a lock pin or pawl 334. As the guide member 310 rotates about the axis 311 in the direction R, the arm 332 drives the pawl 334 into one of a series of holes 336 in the second carrier plate 318. This effectively locks the first carrier plate 304 to the second carrier plate 318. Accordingly, upward rotation of the release arm 322 about the shaft 314 locks the first carrier plate 304 to the second carrier plate 318 and at the same time releases the second carrier plate 318 from the base plate 302, so that the second carrier plate 318 can slide downwardly in the second tracks 320 under force of the tension springs 366 and pretension the harness 16.

As the second carrier plate 318 moves downward, spring-loaded pins 326 having beveled end portions 327 cam over corresponding rows of holes 328 formed in the base plate 302. The beveled end portions 327 enable the pins to move in and out of the holes 328 as the second carrier plate moves 318 downward, but because of the direction of the beveled surfaces 327, the spring-loaded pins 326 act like a ratchet mechanism and engage the holes 328 and prevent upward movement of the second carrier plate 318. This effectively locks the second carrier plate 318 against upward movement with pretension on the harness 16. Subsequently, the pins 326 can be manually or otherwise retracted from the holes 328 and the second carrier plate 318 can be moved back up into position with the springs 366 preloaded in tension.

Figure 4:
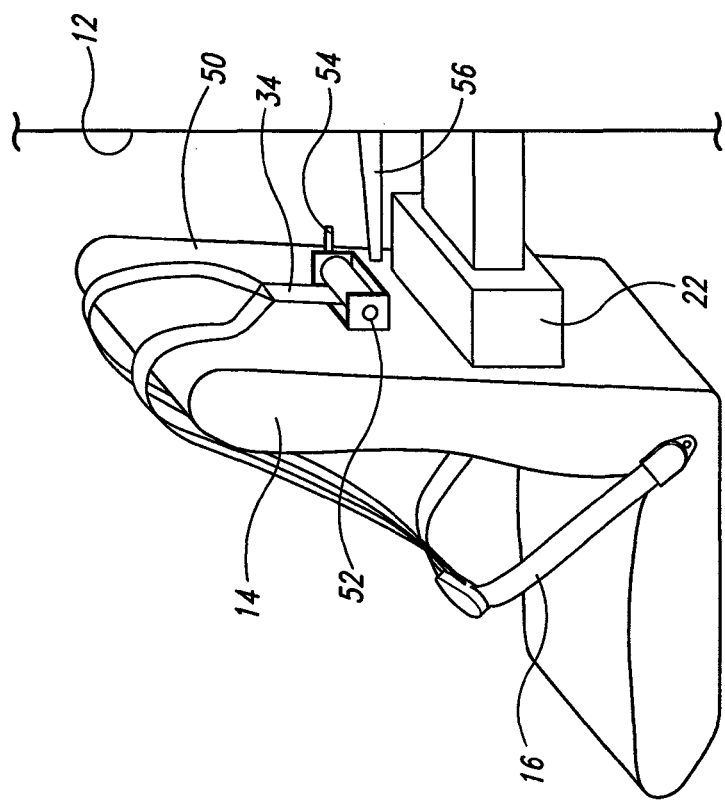
FIG. 4 is a perspective view of a seat harness pretensioner configured in accordance with yet another embodiment of the disclosure.

FIG. 4 is a perspective view of a seat harness pretensioner configured in accordance with yet another embodiment of the disclosure. In this embodiment, the lower end of the tensioning belt 34 is attached onto a retractor or spool 52 on the back surface 50 of the seat 14. A tensioned coil spring exerts torque on the spool. Suitable torsion spring/spool arrangements are known in the art. A trigger element 54 holds the spool 52 from rotating against the torque exerted by the spring. The trigger element 54 is aligned with a trigger arm 56 fixedly attached to the vehicle body 12. As the stroking device 22 moves the seat down during a detonation, the trigger element 54 comes into contact with the trigger arm 56. This causes the trigger element 54 to release the spool. The spool then rapidly winds up the tensioning belt 34, pretensioning the harness. A ratchet or other one way device may be used to prevent the spool 52 from unwinding after the tensioning belt 34 has been wound up. The spool 52, spring, ratchet, trigger element 54 and trigger arm 56 form means for pretensioning the harness with downward movement of the seat.

Figure 5:
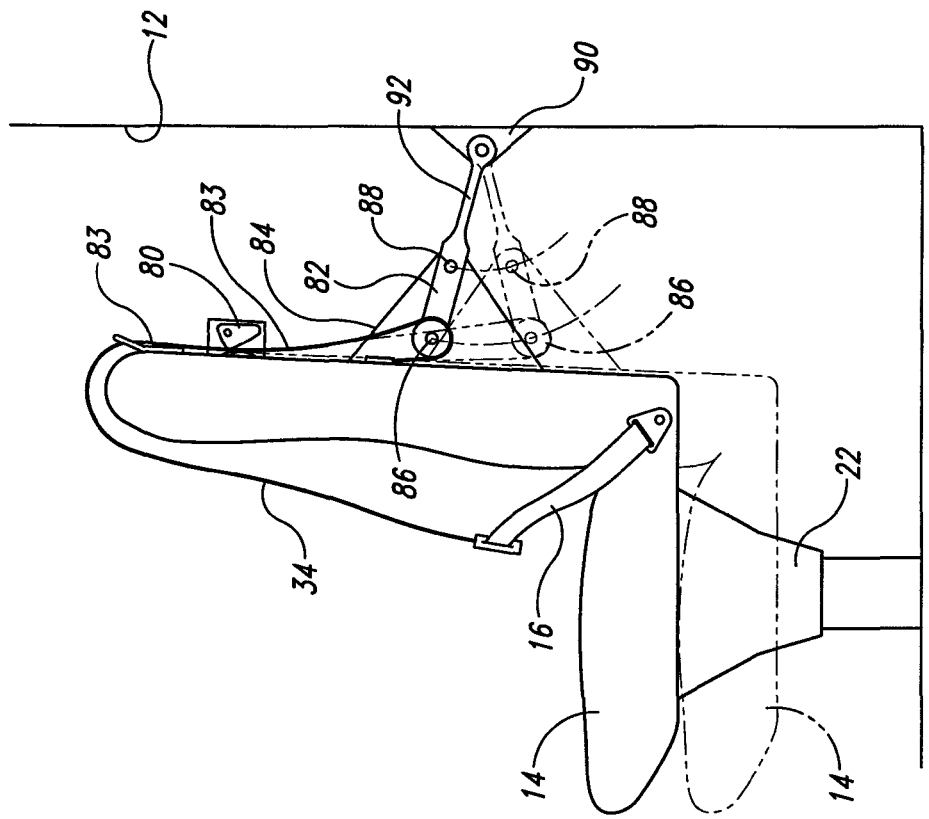
FIG. 5 is a schematic side view of a seat harness pretensioner configured in accordance with a further embodiment of the disclosure.

FIG. 5 is a schematic side view of another embodiment having a pivot arm 82 with one end pivotally attached to a pivot block 90 on the vehicle body 12. The pivot arm 82 is also pivotally attached to a seat pivot block 84 on the back of the seat 14. A roller 86 is attached onto the other end (or front end) of the pivot arm 82. A web, belt or other link 83 connects to the harness 34, passes through a one-way webbing adjuster 80, extends around the roller 86, and is tied off on the seat back or the seat pivot block 84. The one-way webbing adjuster 80 allows only downward (harness tightening) movement of the belt 83. The portion or section of the pivot arm 82 in front of the pivot joint 88 on the seat pivot block 84 may be substantially rigid. The section of the pivot arm 82 extending between the pivot joint 88 and the vehicle pivot block 90 may be flexible, or at least partially flexible, to provide a torque deforming feature which limits the load applied to the harness 34.

FIG. 5 shows the normal positions of the elements in solid lines. The positions of the elements during an impact, detonation, etc. are shown in dotted lines. In use, during an impact, the seat 14 moves down. This causes the pivot arm 82 to pivot down as shown in dotted lines. The roller 86 pulls the belt 83 downwardly, pretensioning the harness 34. The web adjuster 80 holds the harness 34 in the pretensioned condition by preventing reverse movement of the belt 83. As mentioned above, a rear portion of the pivot arm 82 may be flexible. With this option, the pivot arm 82 bends to limit downward movement of the roller 86. The pretensioning force on the harness 34 may be correspondingly limited. The pivot arm 82 mounted as described provides means for pretensioning the harness 34 with downward movement of the seat.

Figure 7:
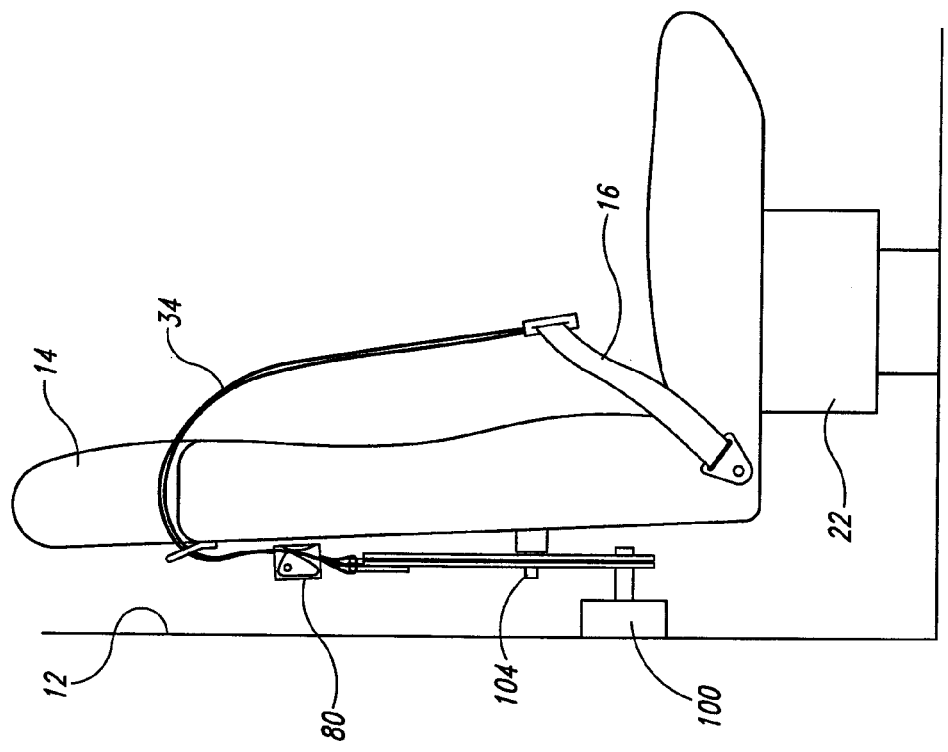
FIG. 7 is a schematic side view of the seat harness pretensioner shown in FIG. 6.
Figure 6:
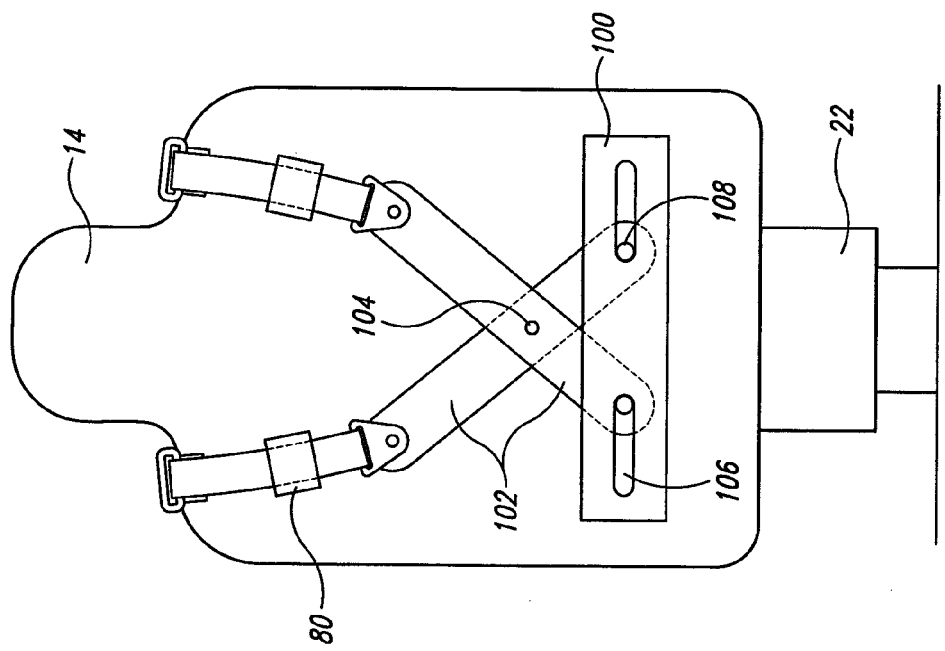
FIG. 6 is a rear schematic view of a seat harness pretensioner configured in accordance with yet another embodiment of the disclosure.

FIG. 6 is a rear schematic view of a seat harness pretensioner configured in accordance with another embodiment of the disclosure, and FIG. 7 is a schematic side view of the seat harness pretensioner shown in FIG. 6. In the embodiment of FIGS. 6 and 7, a track 100 is mounted on the vehicle body 12. Sliders 108 at the lower ends of links or bars 102 hold the lower ends into slots 106 in the track 100. The slots 106 may be horizontal. The links 102 cross over each other forming an X-shape, and are attached to a seat mounted pivot joint 104. Shoulder belts of the seat harness 16 are attached at or near the upper end of each link 102. Each shoulder belt can pass through a corresponding one-way adjuster 80. The one-way adjusters 80 may be used to prevent reverse belt movement. During an impact, explosion, etc., the seat 14 moves down on the stroking device 22. As this occurs, the seat mounted pivot joint 104 also moves down. This drives the sliders 108 to the outside of the slots 106 in the track 100. The upper ends of the links 102 (the sections above the joint 104) move downwardly and away from each other, pulling the shoulder belts with them. This pretensions the seat harness 16.

The pretensioners shown in FIGS. 1-7 are mechanical designs with no pyrotechnic or electrical components needed. Accordingly, these designs can be efficient to manufacture, install and test. These designs can also be highly reliable and resistant to the harsh operating environments that military vehicles must operate in. Of course, the designs shown in FIGS. 1-7 can be modified to include electrical and/or pyrotechnic elements as well. For example, the trigger pin 64 or other triggering element, and/or movement of the tensioning bar 60, may be electrically or pyrotechnically driven or actuated in response to downward movement of the seat during a detonation beneath a land vehicle or, for example, a hard landing in a helicopter.

Figure 8:
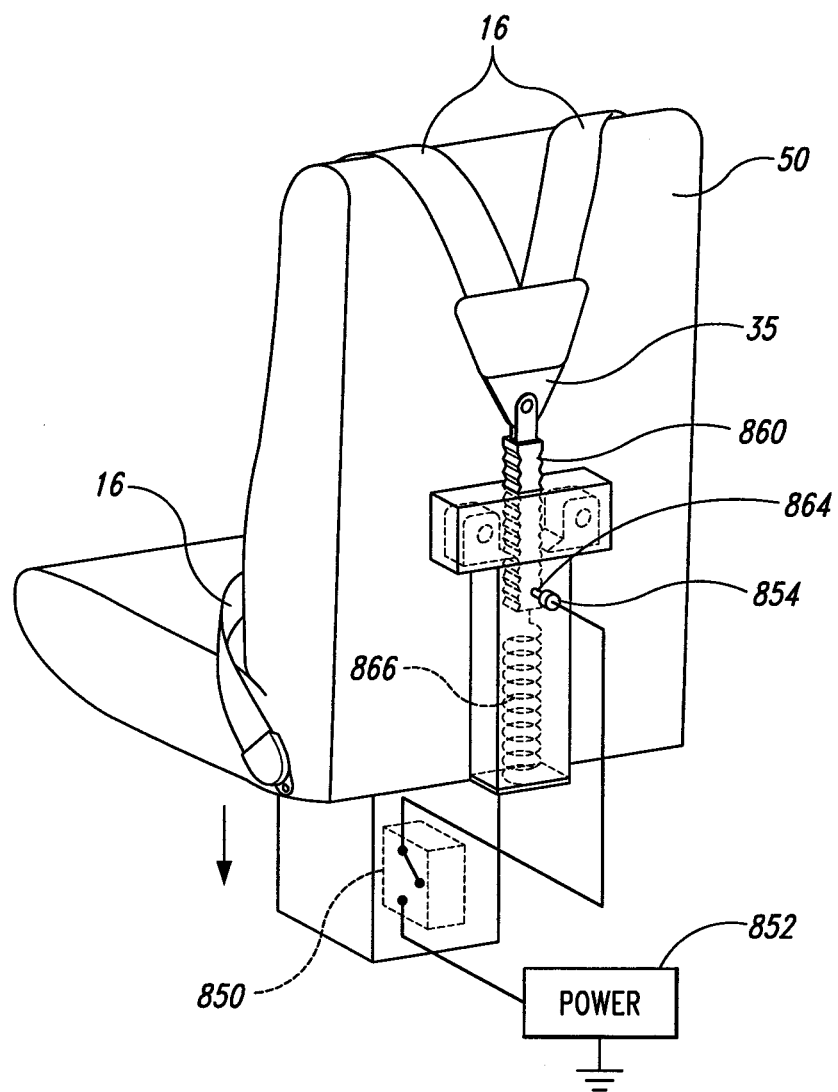
FIG. 8 is a schematic perspective view of a seat harness pretensioner that is electrically actuated in response to seat movement in accordance with a further embodiment of the disclosure.

FIG. 8, for example, illustrates a harness pretensioning system in which an electronic switch 850 is closes or is otherwise activated in response to downward movement or stroking of the seat 50. When the switch 850 closes, power from a power source 852 (such as a vehicle battery) is provided to a solenoid 854 which retracts a trigger pin 864 from a tensioning bar 860. When the pin 864 is retracted, a biasing member or tension spring 866 pulls the tensioning section 35 downwardly and pretensions the harness 16. In other embodiments, the switch 850 can be replaced by a suitable sensor that senses or detects downward movement of the seat relative to the vehicle body 12 and sends a corresponding signal to the solenoid 854 or other device (e.g., a pyrotechnic device such as a squib or pin-puller) to release the tensioning bar 860. In further embodiments, the tensioning bar/spring arrangement can be replaced with and/or supplemented by suitable electric systems for pretensioning the harness 16. Such electric systems can include, for example, an electric powered reel, spool, ratchet, etc.

In one aspect of some of the embodiments disclosed above, the amount of seat harness pretensioning provided by the various pretensioning devices is not proportional to, or otherwise a function of, the amount of downward seat movement. For example, in these embodiments, once the pretensioner has been activated the pretensioner pretensions the seat harness a preset amount (according to, for example, a spring force), regardless of how much the seat strokes downward. In other embodiments, however, the amount of seat harness pretensioning can be a function of, can be proportional to, or otherwise related to the amount of seat movement. One advantage of some of the embodiments described above is that by pretensioning the seat harness, the seat occupant may be drawn more firmly into the seat and in a more favorable orientation to minimize or reduce injury during an explosion, detonation, hard landing, etc.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A vehicle seat unit comprising:
   a seat positioned in a vehicle body;
   a stroking device supporting the seat, wherein the stroking device facilitates movement of the seat in a direction substantially opposite to an impact force acting on the seat;
   a harness configured to restrain a person sitting in the seat; and
   a tensioning member operably coupled to the harness and the vehicle body, wherein movement of the seat in a direction substantially opposite to an impact force acting on the seat causes the tensioning member to pretension the harness.

2. The vehicle seat unit of claim 1 wherein downward movement of the seat mechanically increases the tension in the tensioning member.

3. The vehicle seat of claim 1 wherein the tensioning member includes a web having a first end portion attached to the harness and a second end portion fixedly attached at least indirectly to the vehicle body.

4. The vehicle seat of claim 1 wherein the tensioning member includes a web having a first end portion fixedly attached to the harness and a second end portion fixedly attached to the vehicle body.

5. The vehicle seat of claim 1 wherein the harness includes a lap belt and at least one shoulder belt.

6. The vehicle seat of claim 1, further comprising a roller operably coupled to the seat, wherein the tensioning member includes a belt passing around the roller and having a first end portion attached to the harness and a second end portion fixedly attached at least indirectly to the vehicle body.

7. A pretensioning system for use with a harness of a blast attenuating seat in a military vehicle of the type that moves downward to attenuate blast forces on an occupant in the seat, the seat having a seat base and a seat back, the pretensioning system comprising:
   a guide supported on the seat back; and
   a tensioning belt extending over the seat back and around the guide supported on the seat back, wherein the tensioning belt includes a first end portion attached to the seat harness and a second end portion attached to an anchor point in the vehicle.

8. The pretensioning system of claim 7 wherein the guide includes a roller that movably supports the tensioning belt between the seat harness and the anchor point.

9. An impact attenuating seat unit comprising:
   a seat having a base and a back;
   means for moving the seat downwardly to attenuate impact forces;
   a harness for holding an occupant in the seat; and
   means for pretensioning the harness via downward movement of the seat.

10. The impact attenuating seat unit of claim 9 wherein the means for pretensioning the harness include means for employing the downward movement of the seat to increase the tension in the harness.

11. The impact attenuating seat unit of claim 9 wherein the means for pretensioning the harness include means for pulling on the harness by downward movement of the seat.

12. The impact attenuating seat unit of claim 9 wherein the means for pretensioning the harness include a mechanical system that automatically increases the tension in the harness in the absence of an electrical signal.

13. A method for increasing the tension in a restraint extending at least partially around a person positioned on a seat in a military vehicle, the method comprising:
    moving the seat downward in response to an upward impact force acting on the seat; and
    mechanically pretensioning the restraint via the downward movement of the seat.

14. The method of claim 13 wherein the restraint includes a seat harness, and wherein the downward movement of the seat releases a spring force to pretension the seat harness.

15. The method of claim 13 wherein the restraint includes at least one shoulder belt, and wherein the method further comprises:
    attaching a first end portion of a tensioning member to the shoulder belt; and
    attaching a second end portion of the tensioning member to an anchor point in the vehicle, wherein mechanically pretensioning the restraint includes pulling on at least a portion of the tensioning member with the seat when the seat moves downward in response to an upward impact force acting on the seat.

* * * * *